(12) United States Patent
Fedde

(10) Patent No.: US 9,394,894 B2
(45) Date of Patent: Jul. 19, 2016

(54) VEHICLE COMPRISING A MOUNTED-IMPLEMENT COUPLING AND MOUNTED IMPLEMENT THEREFOR

(71) Applicant: CLAAS INDUSTRIETECHNIK GMBH, Paderborn (DE)

(72) Inventor: Thomas Fedde, Delbrueck (DE)

(73) Assignee: CLAAS Industrietechnik GmbH, Paderborn (DE)

(*) Notice: Subject to any disclaimer, the term of this patent is extended or adjusted under 35 U.S.C. 154(b) by 324 days.

(21) Appl. No.: 14/222,934

(22) Filed: Mar. 24, 2014

(65) Prior Publication Data

US 2014/0294622 A1 Oct. 2, 2014

(30) Foreign Application Priority Data

Mar. 27, 2013 (DE) .......................... 10 2013 005 213

(51) Int. Cl.
*E02F 3/36* (2006.01)
*F04B 35/00* (2006.01)
*E02F 9/22* (2006.01)

(52) U.S. Cl.
CPC ............. *F04B 35/002* (2013.01); *E02F 3/3654* (2013.01); *E02F 9/2232* (2013.01); *E02F 9/2296* (2013.01); *Y10T 137/6881* (2015.04)

(58) Field of Classification Search
CPC ............................... F15B 11/16; E02F 3/3654
USPC ...................................................... 60/420, 433
See application file for complete search history.

(56) References Cited

U.S. PATENT DOCUMENTS

| | | | | |
|---|---|---|---|---|
| 5,727,442 A | * | 3/1998 | Wimmer | E02F 3/3654 91/42 |
| 6,405,529 B1 | * | 6/2002 | Berg | F15B 11/162 60/422 |
| 7,562,525 B2 | * | 7/2009 | Brockmann | F15B 11/162 60/422 |
| 8,160,785 B2 | * | 4/2012 | Kahle | E02F 3/3654 701/50 |

* cited by examiner

*Primary Examiner* — Thomas E Lazo
(74) *Attorney, Agent, or Firm* — Michael J. Striker

(57) ABSTRACT

A vehicle includes a coupling for mounting an implement and a load-controlled hydraulic pump that runs continuously with an engine of the vehicle. The pump draws hydraulic fluid from a low-pressure line region and feeds the hydraulic fluid into a high-pressure line region. The high-pressure line region has a high-pressure connection and the low-pressure line region has a low-pressure connection for supplying the mounted implement. A shutoff valve for blocking the flow of hydraulic fluid to the high-pressure connection is connected upstream of the high-pressure connection in the high-pressure line region.

9 Claims, 2 Drawing Sheets

VEHICLE COMPRISING A MOUNTED-IMPLEMENT COUPLING AND MOUNTED IMPLEMENT THEREFOR

CROSS-REFERENCE TO A RELATED APPLICATION

The invention described and claimed hereinbelow is also described in German Priority Document DE 10 2013 005213.0, filed on Mar. 27, 2013. The German Priority Document, the subject matter of which is incorporated herein by reference, provides the basis for a claim of priority of invention under 35 U.S.C. 119(a)-(d).

BACKGROUND OF THE INVENTION

The invention relates to an agricultural vehicle such as a tractor configured with a coupling for mounting a mounted implement and, a mounted implement suitable for use with the coupling.

Numerous mounted implements for use on tractors have movable parts, which require a drive-energy source in order to be driven. The drive energy required for such a mounted implement is typically tapped from an engine of the tractor, e.g., via a P.T.O. shaft or via hydraulic fluid, wherein this hydraulic fluid is driven by a pump on-board the tractor and circulates in high-pressure lines and low-pressure lines of the tractor and the mounted implement. These lines must be disconnected from one another and reattached to one another every time the mounted implement is replaced on the tractor.

Hydraulic systems for tractors have become known under the name Power-Beyond™, in which the pump throughput is automatically controlled on the basis of the demand by the connected consumers. The pump of such a system runs continuously with the tractor engine in order to continuously maintain a high pressure in the high-pressure line, even when consumers do not draw hydraulic fluid from the high-pressure line. The high pressure must be maintained in order to ensure that, when a consumer begins to draw hydraulic fluid, the pressure in the high-pressure line can decrease and induce a resupply of the quantity pumped by the pump.

The need to have the pump run continuously with the engine also has disadvantages. Since the high pressure is constantly present all the way into the mounted implement, even when the mounted implement is not operating, e.g., while the tractor is traveling on the road, it is possible for hydraulic fluid to be continuously lost at a leaky point. Although the use of self-closing shutoff valves (also referred to as quick-release couplings) on high-pressure and low-pressure connections (which are intended to be connected to one another), of the vehicle and the mounted implement make it possible to disconnect the connections from one another while the engine is running without this resulting in the release of hydraulic fluid, it is necessary to open the shutoff valve of the high-pressure connection on the vehicle against the pressure present there in order to reconnect the aforementioned connections.

The physical strength of an operator is often insufficient therefor, in particular in the case of large line cross-sections. In addition, there is a great risk that, when the shutoff valve opens, the lines of the tractor and the mounted implement will not yet be fixedly connected to one another and hot hydraulic fluid will emerge and injure the operator. When the operator of a tractor comprising a Power-Beyond™ hydraulic system wants to replace a mounted implement that is driven by this hydraulic system with another mounted implement, he generally has no choice but to shut off the engine. In the case of modern vehicles equipped with complex electronic systems in particular, working time is lost, disadvantageously, when the engine is restarted, since the electronics must be powered up.

SUMMARY OF THE INVENTION

The present invention overcomes the shortcomings of known arts, such as those mentioned above.

To that end, the present invention provides a vehicle to which a hydraulically-driven mounted implement is coupled and that allows the mounted implement to be easily replaced even while the vehicle engine is running.

In an embodiment, the vehicle comprises a load-controlled hydraulic pump, which runs continuously with the vehicle engine, for drawing hydraulic fluid from a low-pressure line region and feeding the hydraulic fluid into a high-pressure line region. The high-pressure line region has a high-pressure line connection and the low-pressure line region has a low-pressure connection for supplying a mounted implement that is coupled to the vehicle. A shutoff valve for blocking the flow of hydraulic fluid to the high-pressure connection is connected upstream of the high-pressure connection in the high-pressure line region.

Given that the shutoff valve is switched to the blocking position thereof, the high-pressure connection is decoupled from the pump and, therefore, a section of the high-pressure line region between the shutoff valve and the high-pressure connection becomes depressurized, at the latest, when a mounted implement is decoupled from the high-pressure connection. The depressurized state of the high-pressure connection makes it possible to couple a complementary high-pressure connection of the mounted implement without the need to use excessive force. The coupling procedure can therefore be implemented rapidly and easily, and an uncontrolled leak of hydraulic fluid between the connections is ruled out even when the high-pressure connections of the vehicle and the mounted implement are temporarily not tightly connected during the coupling procedure.

The shutoff valve is preferably a directional control valve, which, in the position thereof blocking the flow of hydraulic fluid to the high-pressure connection, connects the high-pressure connection to the low-pressure line region. In this manner, the depressurized state of the high-pressure connection is directly ensured in that the shutoff valve switches to the blocking position and therefore, even before the operator disconnects the high-pressure connections from one another, an overpressure is no longer present that might result in an uncontrolled spray of hydraulic fluid.

The shutoff valve is preferably designed as a poppet valve in order to ensure high seal integrity of the shutoff valve in the blocking position. This makes it possible to utilize the high output pressure of the pump to press a closing element of the shutoff valve against the valve seat.

The vehicle includes a control unit designed to detect that the mounted implement is connected to the high-pressure and low-pressure connections and to hold the shutoff valve in the blocking position if it is detected that the mounted implement is not connected at one or more of the connections and, therefore, the risk of a leak exists.

It is also advantageous for a control input of the shutoff valve to be directly or indirectly connected to a control connection, to which the mounted implement is connected. As a result, the position of the shutoff valve can advantageously controlled depending on the operating state of the mounted implement. In particular, the shutoff valve should be held in the blocking position when the mounted implement is not connected to the control connection.

Preferably, the control input of the shutoff valve and the control connection of the vehicle are connected via an electric signal line. Such an electric signal line makes it easy to combine control signals for the shutoff valve from a plurality of sources, such as those from the mounted implement and/or those from the vehicle. The electric signal line is designed as a data bus in particular.

Preferably, the shutoff valve is switched into an open position for a limited time in each case by means of a signal that is received at the signal line.

If signals from the mounted implement no longer reach the shutoff valve due to a malfunction, such as a failed connection between the vehicle and the mounted implement, it is thereby ensured that, after the limited time, the malfunctioning mounted implement is no longer supplied with hydraulic fluid. As a result, it is not possible for relatively large amounts of hydraulic fluid to become lost, unnoticed by the driver, via a leak of the mounted implement or the connection between the mounted implement and the vehicle.

A mounted implement for use with the above-described vehicle comprises a high-pressure connection, a low-pressure connection, and a control connection for connection to the corresponding connections of the vehicle, at least one hydraulic consumer, which is supplied via a high-pressure and low-pressure connection, and a control unit, which controls the shutoff valve according to the operating state of the consumer.

BRIEF DESCRIPTION OF THE DRAWINGS

Further features and advantages of the invention will become apparent from the description of embodiments that follows, with reference to the attached figures, wherein.

DETAILED DESCRIPTION OF THE INVENTION

Figure 1:
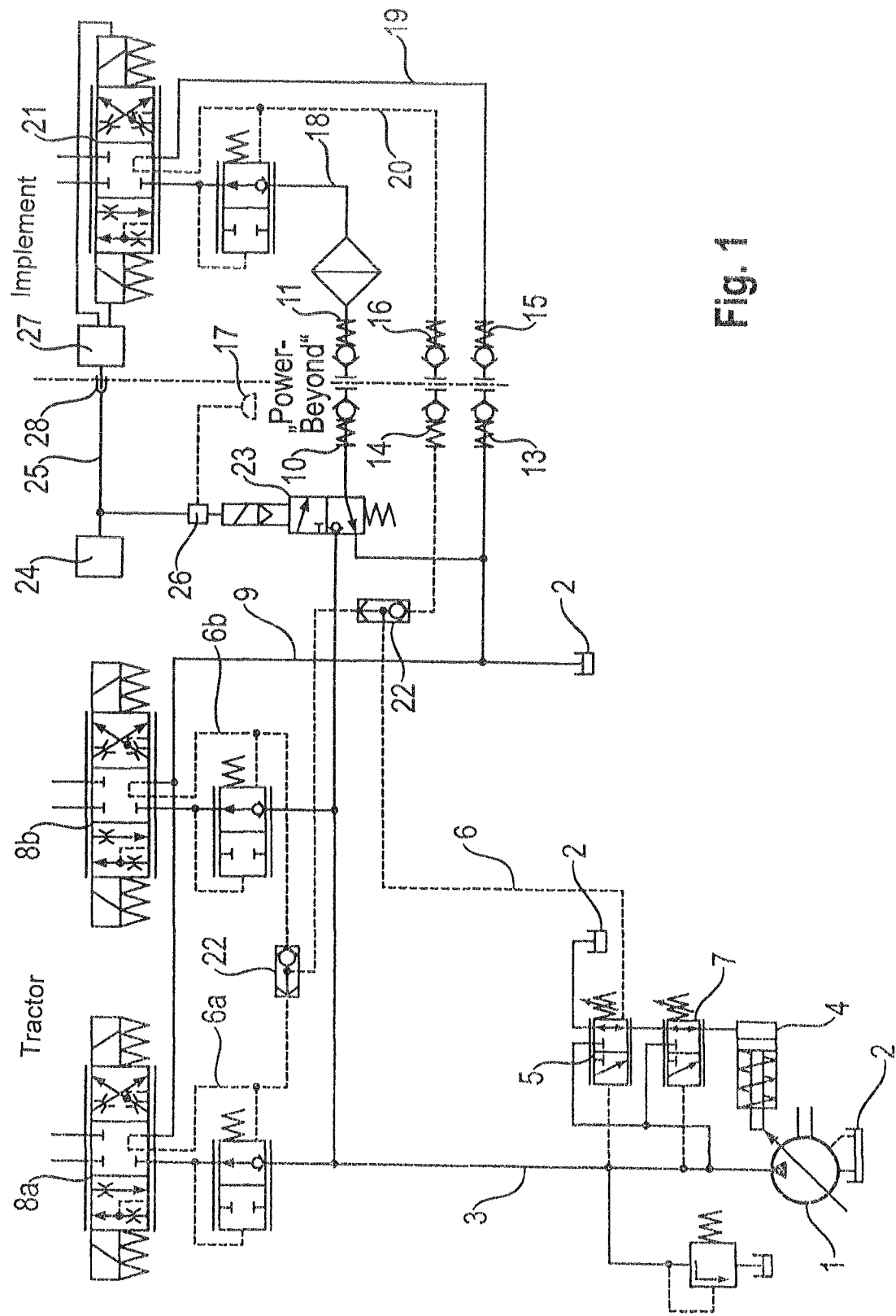
FIG. 1 is a schematic representation of the hydraulic systems of a tractor and an implement mounted on the tractor according to a first embodiment of the present invention.

The following is a detailed description of example embodiments of the invention depicted in the accompanying drawings. The example embodiments are presented in such detail as to clearly communicate the invention and are designed to make such embodiments obvious to a person of ordinary skill in the art. However, the amount of detail offered is not intended to limit the anticipated variations of embodiments; on the contrary, the intention is to cover all modifications, equivalents, and alternatives falling within the spirit and scope of the present invention, as defined by the appended claims.

The hydraulic system on the tractor side is a development of the Power-Beyond™ system, which is known per se. The hydraulic system comprises a variable-displacement pump 1, which is fixedly coupled to a diesel engine (not depicted), and which rotates when the diesel engine is operating. A suction connection of the variable-displacement pump 1 is connected to a tank 2 for hydraulic fluid; a pressure connection leads into a high-pressure line 3. The intake quantity of the variable-displacement pump 1 is controlled by an adjusting cylinder 4. Load-dependence of the control is achieved by a directional control valve, which functions as a control-pressure compensator 5 and connects the adjusting cylinder 4 either to the tank 2 or to the high-pressure line 3.

The position of the control-pressure compensator 5 is determined by mutually counteracting pressures of the high-pressure line 3 and a load-pressure signaling line 6. The pressure on the load-pressure signaling line 6 cannot be greater than that at the high-pressure line 3. Provided the difference between the two pressures is below a specified limit value, the control-pressure compensator 5 assumes the position shown in the FIG. 1, in which hydraulic fluid flows out of the adjusting cylinder 4 to the tank 2 and, as a result, the intake quantity of the variable-displacement pump 1 increases. When a pressure increase at the high-pressure line 3 resulting therefrom induces the control-pressure compensator 5 to switch, the adjusting cylinder 4 is connected to the high-pressure line 3, hydraulic fluid flows therein, and the intake quantity of the variable-displacement pump 1 is reduced. Due to a repeated switching between the positions of the control-pressure compensator 5, an equilibrium pressure sets in at the high-pressure line 3.

A safety valve 7 is installed between the control-pressure compensator 5 and the adjusting cylinder 4. The safety valve 7 is controlled solely by the pressure from the high-pressure line 3. Under normal operating conditions, the safety valve 7 is always in the position shown in the FIG. 1, i.e., connecting the adjusting cylinder 4 and the control-pressure compensator 5. This safety valve establishes a connection between the high-pressure line 3 and the adjusting cylinder 4 only when a maximum permissible pressure at the high-pressure line 3 is exceeded, wherein this connection induces the adjusting cylinder 4 to extend and reduce the intake quantity of the variable-displacement pump 1.

The high-pressure line 3 supplies non-illustrated consumers of the tractor via directional control valves 8a, 8b. FIG. 1 shows two such directional control valves, although the number thereof can vary in practical applications depending on the number of consumers to be supplied. The directional control valves 8a, 8b are each shown here in a blocking position, in which the consumer is disconnected from the high-pressure line 3 and from a low-pressure line 9 leading to the tank 2. In the blocking position of the directional control valve 8a or 8b, a section 6a or 6b, respectively, of the load-pressure signaling line is connected to the low-pressure line 9. The directional control valves 8a, 8b are switched from the blocking position into two open positions, in which they each connect the consumer associated therewith to high-pressure and low-pressure lines 3, 9 and, connect the load-pressure signaling line 6 to the high-pressure line 3.

The high-pressure line 3 of the vehicle ends at a vehicle-side high-pressure connection 10 at the rear of the tractor. A complementary high-pressure connection 11 of a high-pressure line 12 extending on mounted-implement side is detachably connected to this high-pressure connection 10. Correspondingly, the low-pressure line 9 and the load-pressure signaling line 6 extend on the vehicle side to a low-pressure connection 13 and a load-pressure connection 14, respectively, to each of which complementary connections 15, 16, respectively, of the mounted implement are detachably connected.

High-pressure, low-pressure, and load-pressure signaling lines 18, 19, 20 lengthen the corresponding lines of the vehicle on the mounted-implement side. A single directional control valve 21 is shown in the mounted implement, wherein this directional control valve is connected to the lines 18, 19, 20 in order to supply a non-illustrated consumer of the mounted implement. As shown on the tractor side, a plurality of directional control valves also can be connected in parallel to high-pressure and low-pressure lines 18, 19 on the mounted-implement side, in order to supply a plurality of consumers.

The load-pressure signaling lines 6, 20 form a tree-like structure, which proceeds from the control connection of the control-pressure compensator 5 and extends, in a branched manner, to each individual directional control valve 8a, 8b, 21. A shuttle valve 22 is disposed at every branching of the load-pressure signaling line 6. The shuttle valves 22 are each installed such that these permit a high pressure proceeding from one of the directional control valves 8a, 8b, 21 to pass further down the tree to the control-pressure compensator 5, but not to any of the other directional control valves. The load-pressure signaling line 6 therefore acts on the control-pressure compensator 5 with high pressure whenever at least one of the directional control valves 8a, 8b, 21 is in a pass-through position. The pressure at the load-pressure signaling line 6 is low only when all directional control valves 8a, 8b, 21 are in the blocking position, as shown in FIG. 1.

A shutoff valve 23 is installed in the vehicle-side high-pressure line 12 shortly before the high-pressure connection 10. In the position shown in FIG. 1, the shutoff valve 23 connects the high-pressure connection 10 to the low-pressure line 9. The shutoff valve 23 is designed as a poppet valve, i.e., the pressure differential between an inlet of the shutoff valve 23 facing the pump 1 and the outlet thereof, which faces the high-pressure connection 10, holds a sealing element of the valve 23 pressed against a valve seat. In the position of the shutoff valve 23 as shown, the high-pressure line 18 on the mounted-implement side is depressurized, and the consumer of the mounted implement cannot be driven independently of the position of the directional control valve 21.

The shuttle valve 22 closest to the load-pressure connection 14 ensures that the load-pressure connections 14, 16 also are depressurized when one of the vehicle-side consumers is operating and the directional control valve 8a or 8b thereof outputs high pressure to the load-pressure signaling line 6. In this position of the shutoff valve 23, it is easily possible to disconnect the connections 10, 11, 14 and 16 or 13 and 15 from one another and replace the mounted implement with a different mounted implement even while the engine is running and the consumers in the vehicle are functioning.

In the second, open position of the shutoff valve 23, the high-pressure lines 12, 18 of the vehicle and the mounted implement are connected to one another, and the consumer of the mounted implement is operated.

In order to ensure that the connections 10 and 11, 13 and 15 or 14 and 16 are easily connected to one another, the lines 18, 19, 20 on the mounted-implement side are designed as flexible hoses, at least in part. Improper handling or incidents that occur during operation can result in leaks at these hoses. In such a case, the shutoff valve 23 is switched to the blocking position shown in order to prevent the release of hydraulic fluid at the leak. Therefore, the mounted implement need not be removed at the site in order to prevent the further release of hydraulic fluid. instead, the vehicle is driven to a workshop with the implement mounted thereon, in order to eliminate the defect.

According to an embodiment, the shutoff valve 23 is shut off manually by an operator. Preferably, the shutoff valve is electrically switchable and a control element 24 for the remote control of the shutoff valve 23 is installed in a driver's cab of the vehicle. In particular, the control element 24 can communicate with a control unit 26 of the shutoff valve 23 via a data bus 25, such as an ISO bus.

As shown in FIG. 1 for the high-pressure connection 10 as an example, the connections 10, 13, 14 are equipped with sensors 17 in order to detect the presence of the complementary, mounted-implement side connection 11, 15 or 16, respectively. The sensor 17 is connected to the control unit 26, and therefore, regardless of any other commands that may be received via the bus 25, this control unit holds the shutoff valve 23 in the closed position, provided all sensors 17 do not signal the presence of the respective complementary connection.

In an embodiment, the data bus extends via a detachable control connection 28 into the mounted implement and a control unit 27 is provided on the mounted-implement side. The control unit controls the directional control valve 21 or, optionally, the plurality of directional control valves of the mounted implement, as well as the shutoff valve 23 by transmitting commands to the control unit 26 via the bus 25. The control unit 27 is specific to the type of mounted implement and the function thereof. If the mounted implement is a baler, for example, then possible consumers that are controlled by the control unit 27 are, in particular, an adjusting cylinder for the vertical adjustment of a pick-up, compression rollers and an adjusting cylinder for opening the housing of the baler.

Provided the pick-up is lowered and is capable of picking up bale material, then either the compression rollers or the adjusting cylinder for opening the housing are operating, and the control unit 27 holds the shutoff valve 23 in the open position. However, if the pick-up is raised and is incapable of picking up bale material, the other consumers also are at a standstill and the control unit 27 allows the shutoff valve 23 to transition into the blocking position. In this manner, the lines 18, 19, 20 of the baler are automatically depressurized, provided the baler is not operating. If the baler receives a command to lower the pick-up in preparation for operation, the control unit 27 first switches the shutoff valve 23 into the open position in order provide the pressure at the line 18 that is required to displace the pick-up.

The control unit 27 can control the shutoff valve 23 via the data bus 25 by means of a small number of commands, which prompt the valve 23 to switch the position thereof or to assume a position specified in the command and remain in this position until another command is received. However, if the bus between the control unit 27 of the mounted implement and the control unit 26 of the shutoff valve 23 is interrupted due to a malfunction or an accident, it is possible that the shutoff valve 23 will remain in the open position and the consumers of the mounted implement will continue to be driven without the control unit 27 being capable of correctly controlling the operation thereof. This is prevented in that the commands directed to the shutoff valve 23 by the control unit 27 induce a transition into the open position only for a limited time in each case. Provided the control unit 27 functions correctly and these commands arrive at a sufficiently high frequency, the shutoff valve 23 remains in the open position and a continuous supply of the consumers of the mounted implement with hydraulic energy is ensured. However, if these commands no longer arrive due to a malfunction in the mounted implement, the shutoff valve 23 transitions into the blocking position and the consumers come to a halt. Damage resulting from faulty control is therefore ruled out.

Figure 2:
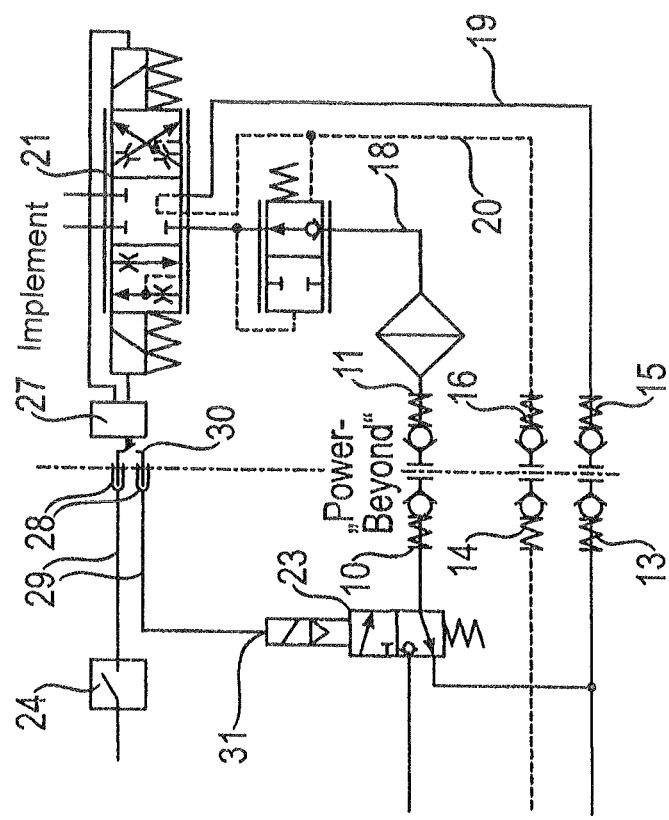
FIG. 2 presents a detailed view of the hydraulic systems of a tractor and a mounted implement according to a second embodiment.

A modification to the FIG. 1 embodiment is shown in FIG. 2. Therein, the control element 24 is a switch from which a control line 29 extends via a relay 30 to a control input 31 of the shutoff valve 23. The relay 30 controlled by the control unit 27 is shown here on the mounted-implement side. The control line 29 extends over the control connection 28. As an alternative, the relay 30 also could be disposed on the tractor side and a portion of the control line could extend between the control unit 27 and the relay 30 via the control connection 28. If the switch 24 and the relay 30 are closed, active potential is present at the control input 31 and the shutoff valve 23 is open. If only either the switch 24 or the relay 30 is open or the control line 29 is interrupted at the control connection 28, the control input 31 assumes open-circuit potential and the shutoff valve 23 switches into the blocking position.

REFERENCE CHARACTERS 1 variable displacement pump
2 tank
3 high-pressure line
4 adjusting cylinder
5 control-pressure compensator
6 load-pressure signaling line
7 safety valve
8 directional control valve
9 low-pressure line
10 high-pressure connecting
11 high-pressure connection
12 high-pressure line
13 low-pressure connection
14 load-pressure signaling connection
15 low-pressure connection
16 load-pressure signaling connection
17 sensor
18 high-pressure line
19 low-pressure line
20 load-pressure signaling line
21 directional control valve
22 shuttle valve
23 shutoff valve
24 control element
25 data bus
26 control unit
27 control unit
28 control connection As will be evident to persons skilled in the art, the foregoing detailed description and figures are presented as examples of the invention, and that variations are contemplated that do not depart from the fair scope of the teachings and descriptions set forth in this disclosure. The foregoing is not intended to limit what has been invented, except to the extent that the following claims so limit that.

What is claimed is:

1. A vehicle comprising:
   a load-controlled hydraulic pump that runs continuously with an engine of the vehicle to draw hydraulic fluid from a low-pressure line region and to feed the hydraulic fluid into a high-pressure line region, wherein the high-pressure line region has a high-pressure connection and the low-pressure line region has a low-pressure connection for supplying a mounted implement that is coupled to the vehicle; and
   a shutoff valve for blocking the flow of hydraulic fluid to the high-pressure connection that is connected upstream of the high-pressure connection in the high-pressure line region.

2. The vehicle according to claim 1, wherein the shutoff valve is a directional control valve, which, in the position thereof blocking the flow of hydraulic fluid to the high-pressure connection, connects the high-pressure connection to the low-pressure line region.

3. The vehicle according to claim 1, wherein the shutoff valve is a poppet valve.

4. The vehicle according to claim 1, further comprising a control unit for detecting that the mounted implement is connected to the high-pressure and low-pressure connection and for holding the shutoff valve in the blocking position the mounted implement is detected to be connected at the high-pressure or low-pressure connections.

5. The vehicle according to claim 1, wherein a control input of the shutoff valve is connected to a control connection to which the mounted implement is connected.

6. The vehicle according to claim 5, wherein the shutoff valve is held in the blocking position when the mounted implement is not connected to the control connection.

7. The vehicle according to claim 5, wherein the control input and the control connection are connected via an electric signal line via a data bus.

8. The vehicle according to claim 7, wherein the shutoff valve is switched into the open position thereof for a limited time by a signal received at the signal line.

9. A mounted implement for a vehicle according to claim 5, comprising
   a high-pressure connection,
   a low-pressure connection,
   a control connection for connection to high-pressure and low-pressure connections of the vehicle,
   at least one hydraulic consumer, and
   a control unit for controlling the shutoff valve according to the operating state of the consumer.

\* \* \* \* \*